United States Patent [19]
Dinkins

[11] Patent Number: 5,592,491
[45] Date of Patent: Jan. 7, 1997

[54] WIRELESS MODEM

[75] Inventor: Gilbert M. Dinkins, Herndon, Va.

[73] Assignee: EON Corporation, Reston, Va.

[21] Appl. No.: 348,618

[22] Filed: Dec. 2, 1994

Related U.S. Application Data

[63] Continuation-in-part of Ser. No. 966,414, Oct. 26, 1992, Pat. No. 5,388,101.

[51] Int. Cl.$^6$ ........................................................ H04J 3/16
[52] U.S. Cl. ............................ 370/277; 455/11.1; 379/59
[58] Field of Search ................................... 370/95.1, 95.2, 370/95.3, 60, 60.1, 94.1, 94.2, 75, 32, 97; 455/34.1, 34.2, 57.1, 58.2, 56.1, 50.1, 51.1, 54.1, 33.1, 33.2, 33.3, 11.1, 13.1, 13.2, 13.3, 13.4, 15, 16; 375/211, 222; 379/4

[56] References Cited

U.S. PATENT DOCUMENTS

| | | | |
|---|---|---|---|
| 5,282,204 | 1/1994 | Shpancer et al. | 370/95.1 |
| 5,494,698 | 8/1995 | Kito | 370/95.1 |

Primary Examiner—Douglas W. Olms
Assistant Examiner—Dang Ton
Attorney, Agent, or Firm—Cushman Darby & Cushman IP Grop of Pillsbury Madison & Sutro, LLP

[57] ABSTRACT

A system and method for communicating between local subscriber units and a local base station repeater cell in a two-way communication interactive video network. In one embodiment, a modem is used to enable communications between a subscriber unit and a local base station repeater cell when the subscriber units are unable to receive rf transmissions from the local base station repeater cell. The local base station repeater cell is connected via a telephone line to the modem. Data communications are sent from the local base station repeater cell to the modem. The modem is also connected via and rf link to the subscriber unit. The modem then transmits the data communications received from the local base station repeater cell to the subscriber unit. Responses from the subscriber unit are then transmitted over the rf link from the subscriber unit to the modem. The modem then transmits the responses over the telephone line to the local base station repeater cell.

23 Claims, 3 Drawing Sheets

WIRELESS MODEM

This is a continuation-in-part of a application Ser. No. 07/966,414, filed Oct. 26, 1992, by G. Dinkins, entitled "Interactive Nationwide Data Service Communication System For Stationary And Mobile Battery Operated Subscriber Units", which issued as U.S. Pat. No. 5,388,101.

TECHNICAL FIELD

This invention relates to an interactive two-way data service network, and more particularly, to communication within an interactive two-way broadcast data service network.

BACKGROUND ART

Communication within an interactive two-way broadcast data service network is described in detail in application Ser. No. 07/966,414, filed Oct. 26, 1992 now U.S. Pat. No. 5,388,101 G. Dinkins, entitled "Interactive Nationwide Data Service Communication System For Stationary And Mobile Battery Operated Subscriber Units" which is incorporated herein by reference. In such a system, a local base station repeater cell comprises a central transmitter and data processing site for transmitting digital data to individual low-cost, portable, battery-operated, milliwatt transmitter, subscriber units within a local base station designated area. A plurality of receive only stations, remote receivers, are distributed throughout the local base station designated area and are connected by wire, cable, microwave link, or radio to the local base station repeater cell. The remote receivers process and relay transmitted digital data received from the individual subscriber units. Thus, the local base station repeater cell transmits data directly to the individual subscriber units. The milliwatt transmitter individual subscriber units, however, do not transmit data directly back to the local base station repeater cell. Instead, the individual subscriber units transmit to a remote receiver which then relays the data to the local base station repeater cell. The use or remote receivers allows the individual subscriber units to transmit data using power in the milliwatt range.

Unfortunately, under certain conditions, individual subscriber units are unable to receive transmissions from the local base station repeater cell. For example, a user may purchase a subscriber unit and place the subscriber unit in an area which is not yet equipped with or is not covered by a local base station repeater cell. Additionally, a subscriber unit may be located within range of a local base station repeater cell, but may be positioned, for example, in a basement or other physical location which prevents the subscriber unit from receiving transmissions from the local base station repeater cell.

In an attempt to alleviate reception problems, local base station repeater cells have been situated with overlapping coverage to produce strong signals throughout a given area. However, such placement of local base station repeater cells is extremely costly due to the number of local base station repeater cells required, and such "crowded" placement of the local base station repeater cells is not always practical. In a further attempt to deal with ineffective communication between the local base station repeater cell and the subscriber unit, the location of the user is determined at the time of sale of the subscriber unit to the user. However, even if the user's location is within an area covered by the local base station repeater cell, the subscriber unit might still be placed in a physical location which prevents the subscriber unit from receiving signals from the local base station repeater cell.

Thus, the need has arisen for a system to enable communications between a subscriber unit and a local base station repeater cell in areas where such communication has previously been impaired, which does not require the addition of numerous costly local station repeater cells, which is not dependent on the physical location of the subscriber unit, and which does not significantly increase the cost of communication within the interactive two-way broadcast data service network.

DISCLOSURE OF THE INVENTION

It is therefore an object of the present invention to provide a system to enable communications between a subscriber unit and a local base station repeater cell in areas where such communication has previously been impaired, which does not require the addition of numerous costly local station repeater cells, which is not dependent on the physical location of the subscriber unit, and which does not significantly increase the cost of communication within the interactive two-way broadcast data service network. The above object has been achieved using a modem which is used to enable communications between a subscriber unit and a local base station repeater cell when the subscriber units are unable to receive rf transmissions from the local base station repeater cell. The local base station repeater cell is connected via a telephone line to the modem. Data communications are sent from the local base station repeater cell to the modem. The modem is also connected via an rf link to the subscriber unit. The modem then transmits the data communications received from the local base station repeater cell to the subscriber unit. Responses from the subscriber unit are then transmitted over the rf link from the subscriber unit to the modem. The modem then transmits the responses over the telephone line to the local base station repeater cell. In so doing, two-way communications in an interactive broadcast network are achieved even in conditions which have previously prevented such communications.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
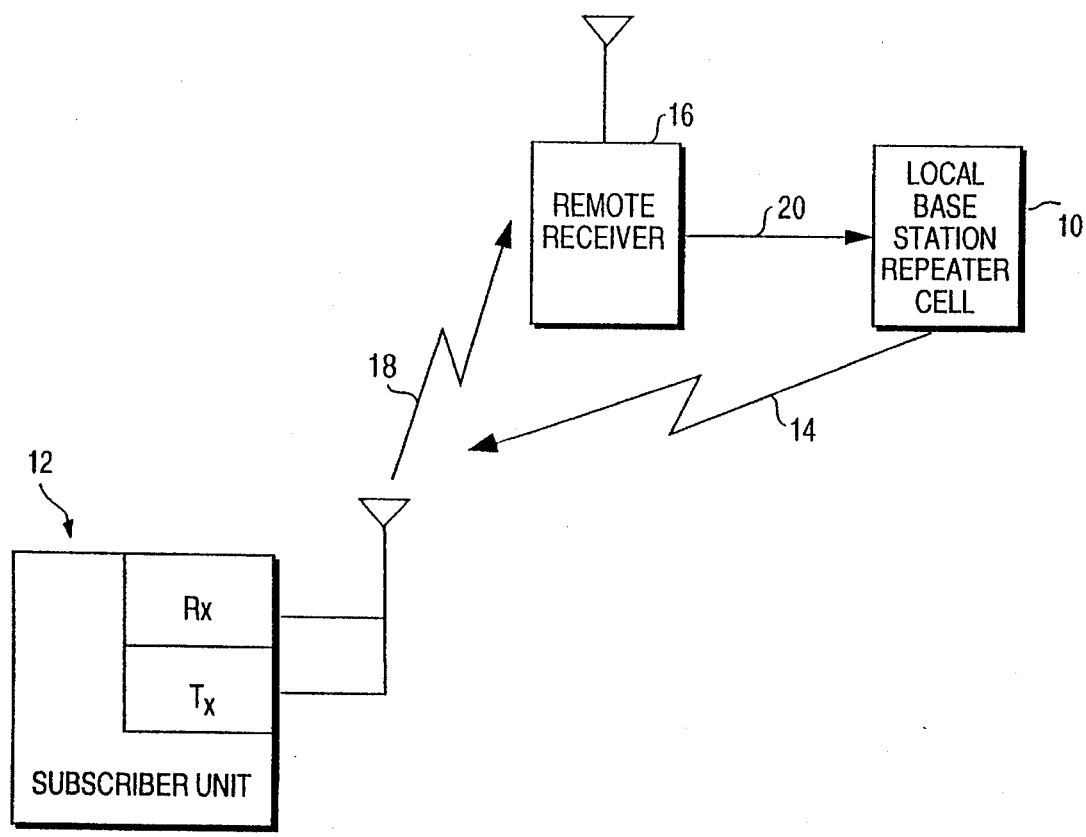
FIG. 1 shows a Prior Art interactive broadcast system wherein a local base station repeater cell transmits data directly to a subscriber unit.

With reference now to Prior Art FIG. 1, an interactive broadcast network as set forth in application Ser. No. 07/966,414, filed Oct. 26, 1992, now U.S. Pat. No. 5,388,101 by G. Dinkins, entitled "Interactive Nationwide Data Service Communication System For Stationary And Mobile Battery Operated Subscriber Units" is schematically shown. As shown in Prior Art FIG. 1, a local base station repeater cell 10 communicates with a subscriber unit 12 over an rf link 14 of, for example 218–219 MHz. Subscriber unit 12 transmits data back to local base station repeater cell 10 via a remote receiver 16. That is, subscriber unit 12 transmits messages directly to remote receiver 16 over an rf link 18. Remote receiver 16 then transfers the messages received from subscriber unit 12 to local base station repeater cell 10 over, for example, hard wire link 20.

With reference still to Prior Art FIG. 1, under certain conditions, subscriber unit 12 is unable to receive transmissions via rf link 14 from local base station repeater cell 10. For example, subscriber unit 12 may be placed in an area which is not yet equipped with or is not covered by a local base station repeater cell. Additionally, subscriber unit 12 may be located within range of local base station repeater cell 10, but may be positioned, for example, in a basement or other physical location which prevents subscriber unit 12 from receiving transmissions from local base station repeater cell 10 over rf link 14.

Figure 2:
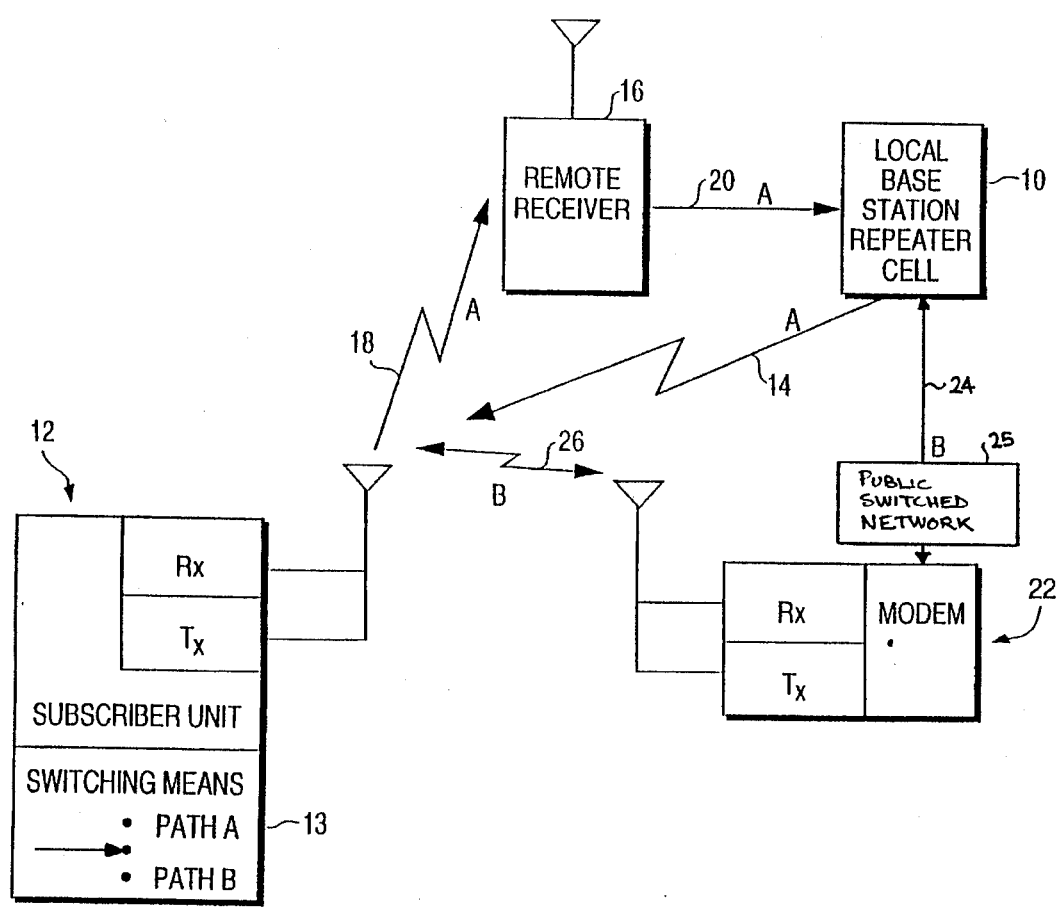
FIG. 2 shows a communication system in an interactive broadcast system wherein a modem enables communication between a local base station repeater cell and a subscriber unit over one of two separate paths in accordance with the present invention.

With reference next to FIG. 2, a communication system including a modem 22 for enabling communication between a local base station repeater cell 10 and a subscriber unit 12 is shown. As shown in FIG. 2, subscriber unit 12 includes switching means such as, for example, an electronic switch 13 for selecting the path of communication between subscriber unit 12 and local base station repeater cell 10. Specifically, in the present embodiment, if subscriber unit 12 is able to detect rf signals from local base station repeater cell 10 switching means 13 assumes a default position "Path A". When switching means 13 of subscriber unit 12 selects Path A, subscriber unit 12 receives rf signals directly from local base station repeater cell 10 over rf link 14, and transmits data over an rf link 18 to remote receiver 16 which then transfers the data to local base station repeater cell 10 over hard link 20.

With reference again to FIG. 2, when subscriber unit 12 is unable to receive rf signals directly from local base station repeater cell 10, switching means 13 selects "Path B". Thus, if subscriber unit 12 is unable to receive rf signals from local base station repeater cell 10, communication between subscriber unit 12 and local base station repeater cell 10 occurs along Path B using modem 22. When switching means 13 of subscriber unit 12 selects Path B, local base station repeater cell 10 transmits messages to modem 22 via, for example, telephone line 24 and public switched network 25. Although a telephone line is used in the present embodiment, the present invention is also well suited to having local base station repeater cell 10 and modem 22 connected by, for example cable, or other means. As shown in FIG. 2, modem 22 communicates with subscriber unit 12 via an rf link 26. In the present embodiment, rf link 26 is at a frequency of approximately 218–219 MHz. Although a frequency of approximately 218–219 MHz is used in the present embodiment, the present invention is also well suited to the use of other frequencies such as, for example, 902 MHz or 45 MHz. Subscriber unit 12 then responds to messages and transmits data messages to local base station repeater cell 10 via modem 22. That is, subscriber unit 12 sends a data message or response over rf link 26 to modem 22. Modem 22 then relays that message or response over link 24 back to local base station repeater cell 10. Thus, two-way communication between local base station repeater cell 10 and subscriber unit 12 is achieved.

With reference still to FIG. 2, in the present embodiment, when communicating over Path B, modem 22 is connected to local base station repeater cell 10 through telephone line 24 using, for example, either an 800 or 900 telephone number. Next, TV listings, for example are downloaded into modem 22 and into subscriber unit 12. The telephone link between subscriber unit 22 and local base station repeater cell 10 via modem 22 is broken after approximately 30 seconds allowing for normal use of the telephone line. Use of the link between subscriber unit 22 and local base station repeater cell 10 via modem 22 is protected by a serial number handshake. Initiation of auto dial-up on a daily or more frequent schedule by subscriber unit 12 insures that the data received by subscriber unit 12 remains current.

Referring still to FIG. 2, the present invention provides for two-way communication between local base station repeater cell 10 and subscriber unit 12 even if subscriber unit 12 is unable to receive rf signals directly from local base station repeater cell 10. Thus, two-way communication between local base station repeater cell 10 and subscriber unit 12 is achieved even when subscriber unit 12 is placed in an area which is not yet equipped with or is not covered by a local base station repeater cell. Additionally, subscriber unit 12 may be located within range of local base station repeater cell 10, but may be positioned, for example, in a basement or other physical location which prevents subscriber unit 12 from receiving transmissions from local base station repeater cell 10 over rf link 14. Furthermore, because subscriber unit 12 only has to transmit messages to nearby modem 22, subscriber unit 12 has a maximum power output in the milliwatt range.

With reference again to FIG. 2, by including remote receiver 16, the present invention is able to function in a standard manner as soon as subscriber unit 12 is able to receive rf signals from local base station repeater cell 10. That is, if subscriber unit 12 is moved, for example, from a basement which prevents the subscriber unit from receiving rf signals from local base station repeater cell 10 to an area in which subscriber unit 12 can receive rf signals from local base station repeater cell 10, conventional two-way communication is resumed. Thus, subscriber unit 12 would receive rf signals directly from local base station repeater cell 10, switching means 13 of subscriber unit 12 would select Path A, and subscriber unit 12 would respond or transmit data messages back to local base station repeater cell 10 via remote receiver 16 thereby eliminating the need for modem 22. Therefore, the present invention is able to compliment a standard two-way interactive data broadcast network and provide two-way communications even in conditions which have previously prevented such communications. Additionally, the present invention does not substantially increase the cost of the standard two-way interactive data broadcast network, and does not require additional local base station repeater cells.

Figure 3:
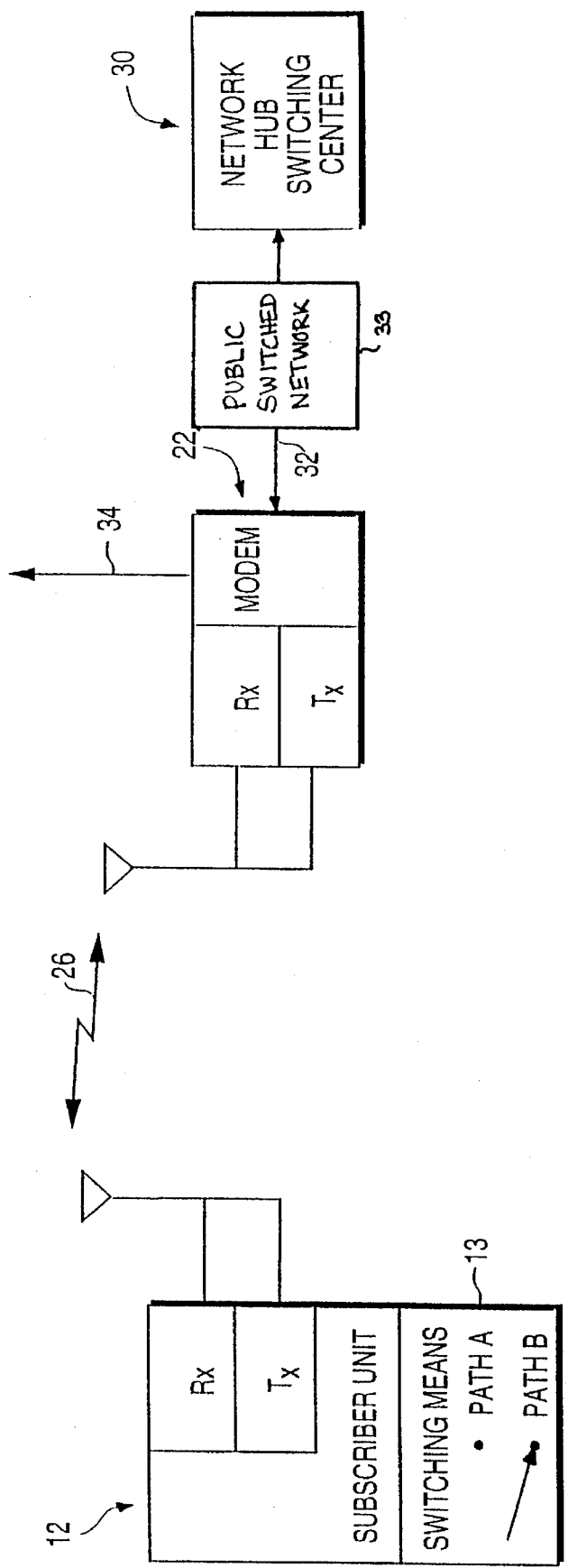
FIG. 3 shows another embodiment of a communication system in an interactive broadcast system wherein a modem enables communication between a subscriber unit and a network hub switching center in accordance with the present invention.

With reference next to FIG. 3, another embodiment of the present invention is shown in which subscriber unit 12 communicates directly with a network hub switching center 30 via modem 22. As shown in the embodiment of FIG. 3, in instances where no local base station repeater cell is located proximate to subscriber unit 12, two-way interactive communication is still possible. Because there is no local base station repeater cell, subscriber unit 12 is unable to receive rf signals from a local base station repeater cell. Thus, switching means 13 selects Path B, such that communication to and from subscriber unit 12 occurs through modem 22.

Referring again to FIG. 3, in the present embodiment, network hub switching center 30 communicates with modem 22 over hard wire link 32 and public switched network 33. Although a telephone line is used in the present embodiment, the present invention is also well suited to having local network hub switching center 30 and modem 22 connected by, for example cable, or other means. As shown in FIG. 3, modem 22 communicates with subscriber unit 12 via an rf link 26. In the present embodiment, rf link 26 is at a frequency of approximately 218–219 MHz. Although a frequency of approximately 218–219 MHz is used in the present embodiment, the present invention is also well suited to the use of other frequencies such as, for example, 902 MHz or 45 MHz. Subscriber unit 12 then responds to messages and transmits data messages to network hub switching center 30 via modem 22. That is, subscriber unit 12 sends a data message or response over rf link 26 to modem 22. Modem 22 then relays that message or response over link 32 back to network hub switching center 30. Thus, two-way communication between network hub switching center 30 and subscriber unit 12 is achieved.

With reference still to FIG. 3, in the present embodiment, modem 22 is connected to network hub switching center 30 through telephone line 32 using, for example, either an 800 or 900 telephone number. The telephone link between subscriber unit 22 and network hub switching center 30 via modem 22 is broken after approximately 30 seconds allowing for normal use of the telephone line. Use of the link between subscriber unit 22 and network hub switching center 30 via modem 22 is protected by a serial number handshake. Initiation of auto dial-up on a daily schedule by subscriber unit 12 insures that the data received by subscriber unit 12 remains current.

With reference again to FIG. 3, modem 22 is also adapted to communicate with a local base station repeater cell when a local base station repeater cell is located proximate to subscriber unit 12. That is, modem 22 is also able to transmit data through line 34 to a local base station repeater cell when a local base station repeater cell becomes available. Therefore, the present invention is able to compliment a standard two-way interactive data broadcast network and provide two-way communications even in conditions which have previously prevented such communications. Additionally, the present invention provides two-way communications even when a local base station repeater cell is not located proximate to a subscriber unit.

The present invention also provides several substantial benefits over a standard two-way interactive data broadcast network. The present invention can be used to provide wireless facsimile service, or to request pay-per-view services even when the subscriber unit is not able to receive rf signals from the local base station repeater cell. Likewise, the present invention also provides for immediate modem access even when the subscriber unit is located, for example, at poolside etc. Additionally, a single modem of the present communication system can be mounted in such a location as to be able to communicate via an rf link to numerous subscriber units placed within homes located, for example, along a single street or within the same neighborhood. In so doing, the present communication system is able to collect data from a number of home appliances, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the claims appended hereto and their equivalents.

I claim:

1. A two-way communication network comprising:

a network hub switching center;

subscriber units dispersed at various locations within a predetermined geographic area, said subscriber units including switching means for selecting a communication path within said network, local base station repeater cell communicating with identified individual subscriber units within a local base station geographic area associated with said local base station repeater cell, said local base station repeater cell further comprising, base station data processing and communication unit for transmitting to a set of said subscriber units contained within said local base station geographic area associated with said local base station repeater cell and receiving from a subset of said set of local subscriber units multiplexed synchronously related digital data messages of variable lengths for point-to-point communication between said local base station repeater cell and said subset of said local subscriber units, reception for receiving and processing data messages from said set of local subscriber units comprising a local remote receiver disposed within one of a plurality of cell subdivision sites partitioned from said local base station geographic area associated with said local base station repeater cell, said plurality of cell subdivision sites dispersed over said local base station geographic area, said local remote receiver being adapted to receive low power digital messages transmitted from said local subscriber units within range of said local remote receiver, said set of local subscriber units including low power mobile units located within said local base station geographic area, each of said local subscriber units adapted to communicate with said local base station repeater cell by way of digital data signals of variable lengths synchronously related to a base station broadcast signal and timed for multiplexed message transmission, and a modem communicatively coupled to said local subscriber units and said local base station repeater cell for transferring said multiplexed synchronously related digital data messages of variable lengths between said set of local subscriber units and said local base station repeater cell if said local subscriber units are unable to directly communicate with said local base station repeater cell.

2. The base station configuration of claim 1 wherein said modem and said local subscriber units are communicatively coupled via an rf link.

3. The base station configuration of claim 2 wherein said rf link between said modem and said local subscriber units is at an rf carrier frequency of approximately 218–219 MHz.

4. The base station configuration of claim 1 wherein said modem and said local base station repeater cell are communicatively coupled via a telephone line.

5. A method of communicating between subscriber units and a local base station repeater cell comprising the steps of:

determining whether a subscriber unit located with a base station geographic area associated with said local base station repeater cell is receiving a signal from said local base station repeater cell;

if said subscriber unit is receiving a signal from said local base station repeater cell, performing the steps of:

transmitting outgoing data from said local base station repeater cell to said subscriber unit by directly transmitting a first outgoing data signal representative of said outgoing data from said local base station repeater cell to said subscriber unit, and transmitting incoming data from said subscriber unit to said local base station repeater cell by transmitting a first incoming data signal representative of said incoming data from said subscriber unit to a receive only receiver unit and then transmitting a second incoming data signal also representative of said incoming data from said receiver unit to said local base station; and if said subscriber unit is not receiving a signal from said local base station repeater cell, performing the steps of:

transmitting said outgoing data from said local base station repeater cell to said subscriber unit by transmitting a second outgoing data signal representative of said outgoing data from said local base station repeater cell to a modem and then transmitting a third outgoing data signal also representative of said outgoing data from said modem to said subscriber unit, and transmitting said incoming data from said subscriber unit to said local base station repeater cell by transmitting a third incoming data signal representative of said incoming data from said subscriber unit to said modem and then transmitting a fourth incoming data signal also representative of said incoming data from said modem to said local base station.

6. The communication method of claim 5 wherein the step of transmitting said second outgoing data signal from said local base station repeater cell to said modem further comprises transmitting said second outgoing data signal from said local base station repeater cell to said modem via a telephone line.

7. The communication method of claim 5 wherein the step of transmitting said third outgoing data signal from said modem to said subscriber unit further comprises transmitting said third outgoing data signal from said modem to said subscriber unit via an rf link.

8. The communication method of claim 7 wherein the step of transmitting said third outgoing data signal from said modem to said subscriber unit via an rf link further comprises transmitting said third outgoing data signal from said modem to said subscriber unit at an rf carrier frequency of approximately 218–219 MHz.

9. The communication method of claim 5 wherein the step of transmitting said third incoming data signal from said subscriber unit to said modem further comprises transmitting said third incoming data signal from said subscriber unit to said modem via an rf link.

10. The communication method of claim 9 wherein the step of transmitting said third incoming data signal from said subscriber unit to said modem via an rf link further comprises transmitting said third incoming data signal from said subscriber unit to said modem at an rf carrier frequency of approximately 218–219 MHz.

11. The communication method of claim 5 wherein the step of transmitting said fourth incoming data signal from said modem to said local base station repeater cell further comprises transmitting said fourth incoming data signal from said modem to said local base station repeater cell via a telephone line.

12. A digital cellular communication system comprising in combination:

a cell site divided into a plurality of subdivided zones, a plurality of subscriber units with identity numbers based in said cell site, a cell site communication system including a digital transmitter for communication with individual identified subscriber units geographically located within said cell site, a set of receive only digital receivers positioned in said subdivided zones, each said digital receiver being coupled by a transmission link with said cell site communication system to relay received digital communications, a set of said subscriber units comprising portable wireless digital communication units with a limited power digital transmitter having a transmitting power for transmissions within said subdivided zones, a receiver for reception of digital messages from said cell site digital transmitter, a modem communicatively coupled to said local subscriber units and said digital transmitter for transferring data between said subscriber units and said digital transmitter if said subscriber units are unable to communicate directly with said digital transmitter.

13. A two-way communication system comprising:

at least one subscriber unit disposed within a predetermined base station geographic area, said at least one subscriber unit including switching means for selecting a communication path within said communication system, a network hub switching center for routing communications from and to said at least one subscriber unit, and a modem communicatively coupled to said at least one subscriber unit and said network hub switching center for transferring multiplexed synchronously related digital data messages of variable lengths between said at least one subscriber unit and said network hub switching center if said at least one subscriber unit is unable to communicate directly with a local base station repeater cell, said modem also adapted for communicating with said local base station repeater cell if communication therebetween is not otherwise prevented.

14. The base station configuration of claim 13 wherein said modem and said at least one subscriber unit are communicatively coupled via an rf link.

15. The base station configuration of claim 14 wherein said rf link between said modem and said at least one subscriber unit are at an rf carrier frequency of approximately 218–219 MHz.

16. The base station configuration of claim 13 wherein said modem and said network hub switching center are communicatively coupled via a telephone line.

17. A method of communicating between a subscriber unit and a network hub switching center in a two-communication system comprising the steps of:

determining whether a subscriber unit located with a base station geographic area associated a said local base station repeater cell is receiving a signal from said local base station repeater cell;

if said subscriber unit is receiving a signal from said local base station repeater cell, performing the steps of:

transmitting outgoing data from said network hub switching center to said subscriber unit via said local base station repeater cell, and transmitting incoming data from said subscriber unit to said network hub switching center via said local base station repeater cell; and if said subscriber unit is not receiving a signal from said local base station repeater cell, performing the steps of:

transmitting said outgoing data from said network hub switching center to said subscriber unit by transmitting a first outgoing data signal representative of said outgoing data from said network hub switching center to a modem and transmitting a second outgoing data signal also representative of said outgoing data from said modem to said local base station repeater cell, and transmitting incoming data from said subscriber unit to said network hub switching center by transmitting a first incoming data signal representative of said incoming data from said subscriber unit to said modem and transmitting a second incoming data signal also representative of said incoming data from said modem to said network hub switching center.

18. The communication method of claim 17 wherein the step of transmitting said first outgoing data signal from said network hub switching center to said modem further comprises transmitting said first outgoing data signal from said network hub switching center to said modem via a telephone line.

19. The communication method of claim 17 wherein the step of transmitting said second outgoing data signal from said modem to said subscriber unit further comprises transmitting said second outgoing data signal from said modem to said subscriber unit via an rf link.

20. The communication method of claim 19 wherein the step of transmitting said second outgoing data signal from said modem to said subscriber unit via an rf link further comprises transmitting said data from said modem to said subscriber unit at an rf carrier frequency of approximately 218–219 MHz.

21. The communication method of claim 17 wherein the step of transmitting said first incoming data signal from said subscriber unit to said modem further comprises transmitting said first incoming data signal from said subscriber unit to said modem via an rf link.

22. The communication method of claim 21 wherein the step of transmitting said first incoming data signal from said subscriber unit to said modem via an rf link further comprises transmitting said first incoming data signal from said subscriber unit to said modem at an rf carrier frequency of approximately 218–219 MHz.

23. The communication method of claim 17 wherein the step of transmitting said second incoming data signal from said modem to said network hub switching center further comprises transmitting said second incoming data signal from said modem to said network hub switching center via a telephone line.

* * * * *

UNITED STATES PATENT AND TRADEMARK OFFICE
CERTIFICATE OF CORRECTION

| | | |
|---|---|---|
| PATENT NO. | : 5,592,491 | Page 1 of 1 |
| APPLICATION NO. | : 08/348618 | |
| DATED | : January 7, 1997 | |
| INVENTOR(S) | : Gilbert M. Dinkins | |

It is certified that error appears in the above-identified patent and that said Letters Patent is hereby corrected as shown below:

At column 6, line 65 (in claim 2); column 7, line 1 (in claim 3); and column 7, line 4 (in claim 4):
The text "base station configuration" should read --two-way communication network--

At column 7, line 26 and line 43 (in claim 5):
The text "base station" should read --base station repeater cell--

At column 8, line 55 (in claim 14), column 8, line 58 (in claim 15); and column 8, line 62 (in claim 16):
The text "base station configuration" should read --two-way communication system--

At column 9, lines 21-22 (in Claim 17):
The text "local base station repeater cell" should read --subscriber unit--

Signed and Sealed this

Seventeenth Day of November, 2009

David J. Kappos
*Director of the United States Patent and Trademark Office*